No. 868,992. PATENTED OCT. 22, 1907.
W. E. KING & C. WINBURN.
SEWER CLEANING DEVICE.
APPLICATION FILED NOV. 1, 1906.
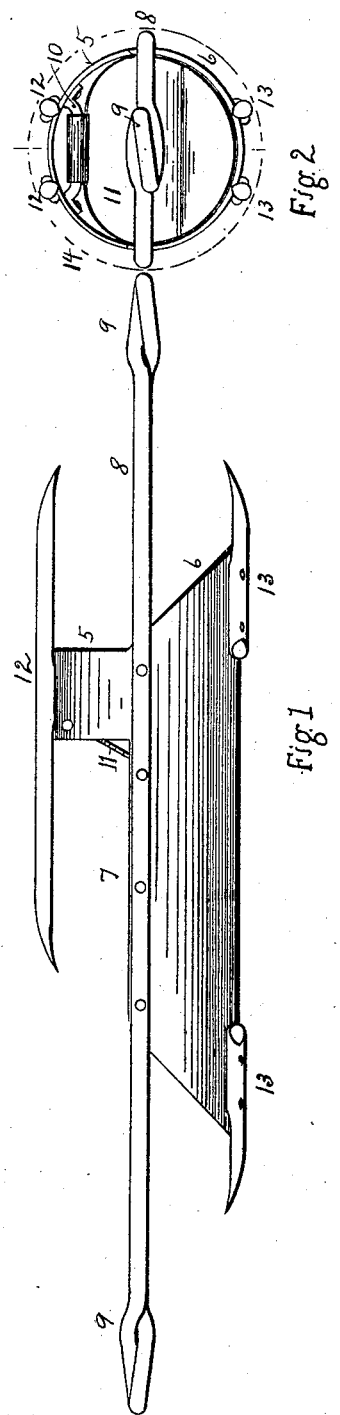
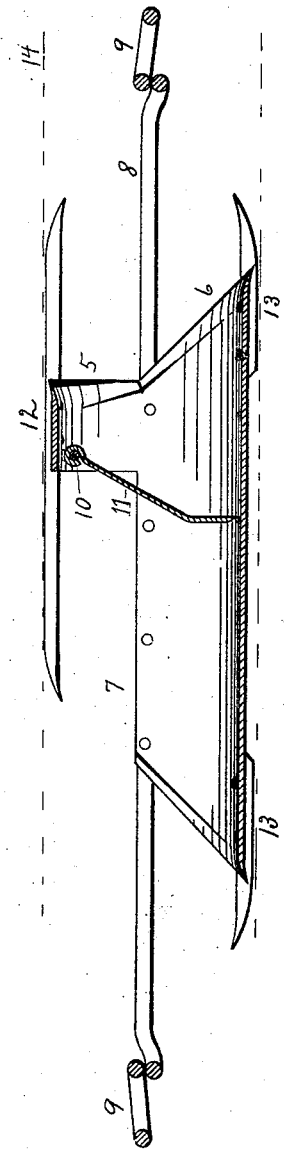
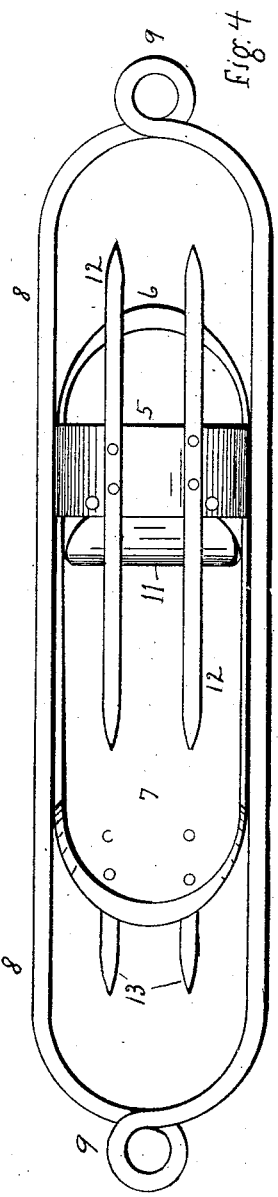
Witnesses
Inventors
Willard E. King
Charles Winburn
By J. A. Rosen, atty

UNITED STATES PATENT OFFICE.

WILLARD E. KING AND CHARLES WINBURN, OF TOPEKA, KANSAS.

SEWER-CLEANING DEVICE.

No. 868,992.          Specification of Letters Patent.          Patented Oct. 22, 1907.

Application filed November 1, 1906. Serial No. 341,546.

*To all whom it may concern:*

Be it known that we, WILLARD E. KING and CHARLES WINBURN, citizens of the United States of America, and residents of the city of Topeka, in the county of Shawnee and State of Kansas, have invented a new and useful Improvement in Sewer-Cleaning Devices, of which the following is a specification.

Objects of the invention are: to provide a simple, durable, and efficient sewer cleaning device, which will not only loosen the contents of a choked sewer but will also cut roots, loosen all brick and other hard substances, and whereby the entire contents of the sewer may be easily removed; and to improve generally upon sewer cleaning devices.

It consists principally of a circular cutting tool and a valve therein covering substantially the entire opening; and it further consists of the parts, improvements, and combinations hereinafter described and claimed.

In the drawings accompanying and forming part of this specification and in the description thereof, we illustrate the invention in its preferred form and show the best mode of applying the principles thereof; but it is to be understood that the invention itself is not confined to the details of the drawings and the description of the drawings, that parts and combinations thereof as separately claimed may be used either with or without the other part or parts of like general nature, and that we contemplate changes in form, proportions, materials, arrangement, the transposition of parts, and the substitution of equivalent members, without departing from the spirit of the invention.

Figure 1 is a side view of a sewer cleaning device made in accordance with the principles of our invention; Fig. 2 is a front-end view; Fig. 3 is a center vertical longitudinal sectional view; and Fig. 4 is a plan view.

Like reference numerals indicate like or corresponding parts throughout the several views.

We provide a circular cutting tool 5, the lower portion of which may project forwardly, 6, and the rear portion of which may be merely semi-circular in form, the upper portion being cut away, as shown at 7. Along on the two sides of the cutting tool, and on the outside thereof, is a frame or bail 8, which terminates at opposite ends in the two eyes 9, 9. This frame or bail may be riveted or otherwise suitably secured to the cutting tool. A valve 11, which is substantially of the same form and area as the opening through the cutting tool, is hinged to the upper part of the cutting tool, as to a rod or pin 10, the two ends of which may be riveted to said tool. The lower part of the valve is bent at an angle inwardly, so as to always close itself when the device is drawn backwards. The circular cutting tool is cut away just behind this valve, so as to permit the valve to be raised up without encountering the sides or top of the cutting tool; if it were not thus cut away, the valve could not be turned on the hinge so as to make a substantially complete opening through the tool. The cutting tool is armored with a number of teeth or pikes 12, 12, 13, 13, which are fastened to the outside of the cutting tool and project both forwardly and rearwardly, their points being turned slightly inwardly; they assist in the cutting, they break up and loosen the bricks and other hard substances, they serve as guides, and take the brunt of the wear. The tool should be made of such size that it will snugly fit in the sewer to be cleaned.

The device is made preferably of steel, the circular cutting tool being made preferably of spring-steel in order to yield whenever the teeth or the frame or the tool itself are drawn past a hard and narrow obstruction. The cutting tool is sharpened so that the bevel is on the inside and preferably the cutting edge is flared outwardly slightly.

In operation a hole is first made through the sewer to be cleaned of sufficient size to pass a cable therethrough. The tool described is attached to the end of the cable and another cable is attached to the other end of the tool for the purpose of pulling it backwards. The tool is drawn forward cutting its way and forcing the contents of the sewer through the opening and under the valve. The slight flaring out of the cutting edge causes the contents to be squeezed as it passes through the tool, thus pressing out the slime, which makes the passage-way slick. When the tool has been drawn forward a long enough distance, it is pulled back, causing the valve to close, and drawing out all the contents back of it. Obviously the rearward extension 7 serves to hold the contents, but this extension is not essential, as the walls of the sewer itself serve as a conveyer and the valve and circular cutting tool as a plunger therein; and thus a much longer core than one of the length of the rearward extension may be drawn out at once, reference being had to the nature of the sewer contents in determining how long a core to take out at once.

What we claim is:

1. In a sewer-cleaning device, the combination of a hollow circular cutting tool of a size adapted to fit snugly into the sewer to be cleaned, having its cutting edges flared out slightly and the lower portion projecting forwardly and rearwardly, a single integral valve hinged to the upper part thereof, covering substantially the entire opening therethrough, and having its lower portion bent inwardly; a bail or frame secured to the outside of the cutting tool and terminating at both ends with means suitable for attaching a cable thereto, and pikes secured to the outside of the tool and projecting in advance thereof and having their points bent inwardly.

2. In a sewer-cleaning device, the combination of a hollow circular cutting tool of a size adapted to fit snugly into the sewer to be cleaned, a single integral valve hinged to the upper part thereof covering substantially the entire opening therethrough and having its lower portion bent inwardly; a bail or frame secured to the outside of the cutting tool and terminating at both ends with means suitable for attaching a cable thereto, and pikes secured to the outside of the tool and projecting in advance thereof and having their points bent inwardly.

3. In a sewer-cleaning device, the combination of a hollow circular cutting tool of a size adapted to fit snugly into the sewer to be cleaned, a single integral valve hinged to one side of the cutting tool and covering substantially the entire area in cross section of the passage through the cutting tool, and having its lower portion bent inwardly; a bail or frame secured to the outside of the cutting tool and terminating at both ends with means suitable for attaching a cable thereto, and pikes secured to the outside. of the cutting tool and projecting in advance thereof and having their points bent inwardly.

4. In a sewer-cleaning device, the combination of a hollow circular cutting tool of a size adapted to fit snugly into the sewer to be cleaned and having a thin wall, a single integral valve hinged to one side of the cutting tool and covering substantially the entire area in cross section of the passage therethrough, a bail or frame secured to the cutting tool and provided with means for attaching a cable thereto, and pikes secured to the cutting tool and extending outside of the circumference of the tool and projecting in advance of the tool and having their ends bent inwardly.

5. In a sewer-cleaning device, the combination of a hollow circular cutting tool of a size adapted to fit snugly nto the sewer to be cleaned, and having a clear passage therethrough, a single integral valve hinged to one side of the cutting tool and covering substantially the entire area in cross section of the passage through the tool, means for attaching a cable to the tool, and pikes adapted to bear against the walls of the sewer and extending in advance of the tool and having their ends bent inwardly.

6. In a sewer-cleaning device, the combination of a hollow circular cutting tool of a size adapted to fit snugly into the sewer to be cleaned, and a single integral valve covering substantially the entire opening therethrough and hinged to one side of the cutting tool, said cutting tool being cut away behind the valve to permit it to open substantially the entire area in cross section through the cutting tool.

In testimony whereof we have hereunto signed our names in the presence of witnesses.

WILLARD E. KING.
                          his
            CHARLES × WINBURN.
                          mark Witnesses:
  A. A. MUNCEY,
  J. T. WARD.